United States Patent [19]

Haegele

[11] Patent Number: 5,411,131

[45] Date of Patent: May 2, 1995

[54] NON-SYNCHRONOUS CONVEYOR SYSTEM FOR ASSEMBLY OPERATIONS

[76] Inventor: Richard P. Haegele, 888 Linden Dr., Elmhurst, Ill. 60126

[21] Appl. No.: 259,693

[22] Filed: Jun. 13, 1994

[51] Int. Cl.⁶ .............................................. B65G 37/00
[52] U.S. Cl. .................................. 198/572; 198/347.4
[58] Field of Search ............... 198/571, 572, 447, 448, 198/347.4, 810

[56] References Cited

U.S. PATENT DOCUMENTS

| | | | |
|---|---|---|---|
| 3,118,549 | 1/1964 | Hoellen | 198/347.44 |
| 3,153,487 | 10/1964 | Hoellen | 198/347.4 |
| 3,181,713 | 5/1965 | Abbe et al. | 198/347.4 |

Primary Examiner—Cheryl L. Gastineau

[57] ABSTRACT

A non-synchronous plural conveyor system for transporting articles between work stations which operate at varying production rates. Each conveyor operates alternately in an accumulate or deliver mode such that articles may be placed thereon at a first station at a rate different from the rate they are removed at a second station.

6 Claims, 1 Drawing Sheet

NON-SYNCHRONOUS CONVEYOR SYSTEM FOR ASSEMBLY OPERATIONS

BACKGROUND OF THE INVENTION

1. Field of the Invention

The present invention relates generally to conveyor systems and more particularly to a non-synchronous plural conveyor system for transporting articles between two work stations operating at varying production rates.

2. Description of the Prior Art

In product assembly operations, it is a common requirement that articles undergo sequential assembly steps at a number of separate work stations. The assembly steps, whether performed manually or automatically, require that the articles be transported from one work station to the next in an orderly fashion. In an ideally balanced system the output of a first work station is adequate to fully occupy the next without overloading.

Prior to the present invention three basic techniques have been used to move articles between work stations. The first and simplest involves the use of totes or trays which are filled with production articles at a first station, then moved to a second station where the articles are removed for the next and each subsequent operation. This technique is slow and cumbersome, strenuous to operators and not adapted for efficient use of production floor space. Core conveyors generally run continuously at a slow rate with assembly operators stationed along one or both sides. These are synchronous systems which remain in balance only so long as each individual operator functions at a rate no higher or lower than the design rate for the conveyor system. Of more recent vintage are power and free pallet systems which are complex and expensive and therefore of practical utility only for high volume automatic or near-automatic assembly operations.

None of the prior art conveyor systems is well suited to maximizing the production efficiency of assembly operations with work stations which operate at varying rates, as most do. Neither are the prior art systems particularly adaptable for efficient use in mixed; i.e. automated/manual assembly operations.

OBJECTIVES AND SUMMARY OF THE INVENTION

From the preceding discussion, it will be understood that among the various objectives of the present invention are included the following:

the provision of a new and improved conveyor system for transporting articles between work stations in an assembly or similar operation;

the provision of an apparatus of the above-described character useful between work stations which operate at varying production rates;

the provision of an apparatus of the above-described character having a plurality of non-synchronous conveyors adapted to operate alternately in accumulate and deliver modes.

These as well as other objectives of the present invention are efficiently achieved by providing at least two conveyors adapted to operate alternately in an accumulate or deliver mode. As articles are placed on one conveyor, it incrementally advances to make room for the next and thus accumulates articles to be delivered to the next work station. The other conveyor also advances incrementally as articles are removed to bring the next article into position to be removed. Upon depletion of articles at the delivery end of the conveyor operating in the deliver mode, the operation of the conveyors is reversed to alternate the accumulate and deliver modes of operation. Articles are thus sequentially accumulated on one conveyor at a first work station and similarly removed from the other conveyor at the second work station. Each operator thus is able to work at their own pace without being either delayed or overloaded by the other.

The foregoing as well as other objects, features and advantages of the present invention will become more apparent from the following detailed description taken in conjunction with the various views of appended drawings.

DESCRIPTION OF THE PREFERRED EMBODIMENT

Figure 1:
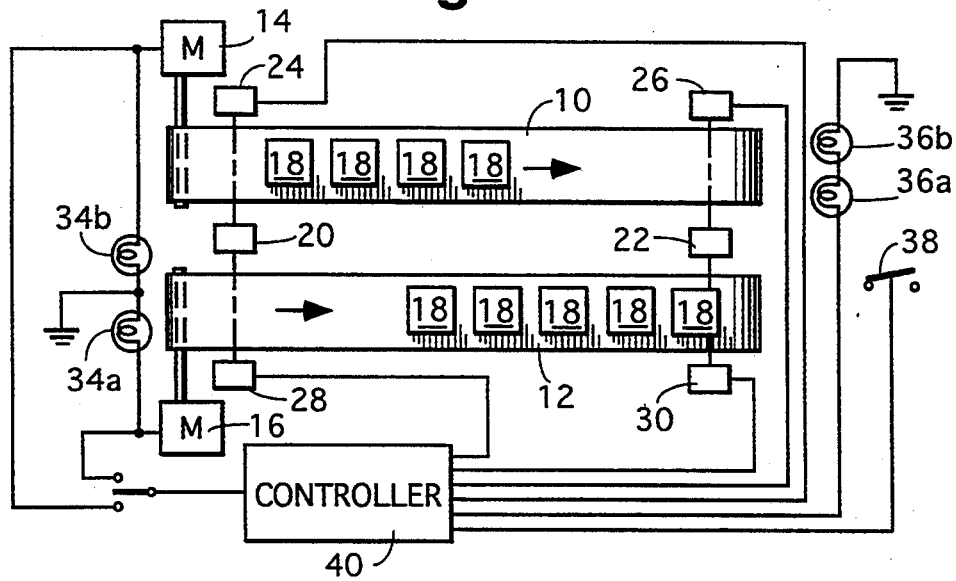
FIG. 1 is a schematic representation of a non-synchronous conveyor system embodying the principles of the present invention.

With reference now to FIG. 1 there is illustrated in schematic form a conveyor system in accordance with the principles of the present invention. In its simplest form the system uses two belt-type continuous conveyors 10 and 12 each independently driven by an associated drive motor 14 and 16 respectively. In practice, low profile belt conveyors such as the 2100 Series available from Dorner Manufacturing Corporation of Hartland, Wis. have been found suitable, however, other types and styles may also be useful. Heavy duty direct current gearmotors with helical gearing running in oil are preferred for their exceptional stability, quick response and smooth but high start/stop rates. Other various types of fixed and variable speed drive motors are useful and may be selected according to the demands of the particular conveyor system.

Each end of each conveyor 10 and 12 is provided with a sensor for detecting the presence of an article 18 at the input as well as the output. Electro-optic sensors comprising bi-directional light sources 20 and 22 and photoelectric cells 24, 26, 28 and 30 are particularly well suited to this application. The photoelectric cell outputs are coupled to a controller 40 which operates to selectively activate the drive motors 14 and 16. An indicator 34 may be provided to identify to the operator at the input end of the system which of the conveyors 10 or 12 is in the accumulate mode at any given time.

For purposes of illustration assume that conveyor 10 is in the accumulate mode. As the operator places an article 18 on conveyor 10, the output of photoelectric cell 20 is interrupted causing the controller 40 to activate motor 14 and incrementally advance conveyor 10 one position. Conveyor advancement may easily be by means of a timed operation of the drive motors 14 and 16 which is adjustable to accommodate articles of various dimensions. Conversely, conveyor 12 is in the deliver mode. When the operator at the output removes an article from conveyor 12 the photoelectric cell 30 produces an output signal causing the controller 40 to actuate motor 16 and incrementally advance conveyor 12 one position. Thus, there is always room at the input end for the next article and an article is always in position and available for removal at the output end.

When the supply of articles available for removal from conveyor 12 has been exhausted the operator at the output end of the system operates a switch 38 or an other sensing system is activated causing the controller 40 to alternate the operation of the conveyors 10 and 12; i.e. conveyor 10 is switched to the deliver mode and conveyor 12 is switched to the accumulate mode. The indicator 34 at the input is changed to indicate conveyor 12 as being in the accumulate mode and ready to receive the next article 18. If at the time the operation is switched articles have not advanced to the end of what had been the accumulate conveyor, the drive motor may be operated at a higher speed until an article blocks the appropriate detector. This operation serves to minimize the delay in conveying previously accumulated articles to the delivery end.

As a production incentive it is also possible to incorporate into the controller 40 means for sensing the rate at which each of the conveyors 10 and 12 is incrementally advanced. If the rate of advance of a conveyor falls below some preselected minimum the indicator 36 is caused to operate in a flashing or other mode. This serves as an indicator to both the operator as well as supervisory personnel that the operation is not proceeding at an adequate pace.

Figure 2:
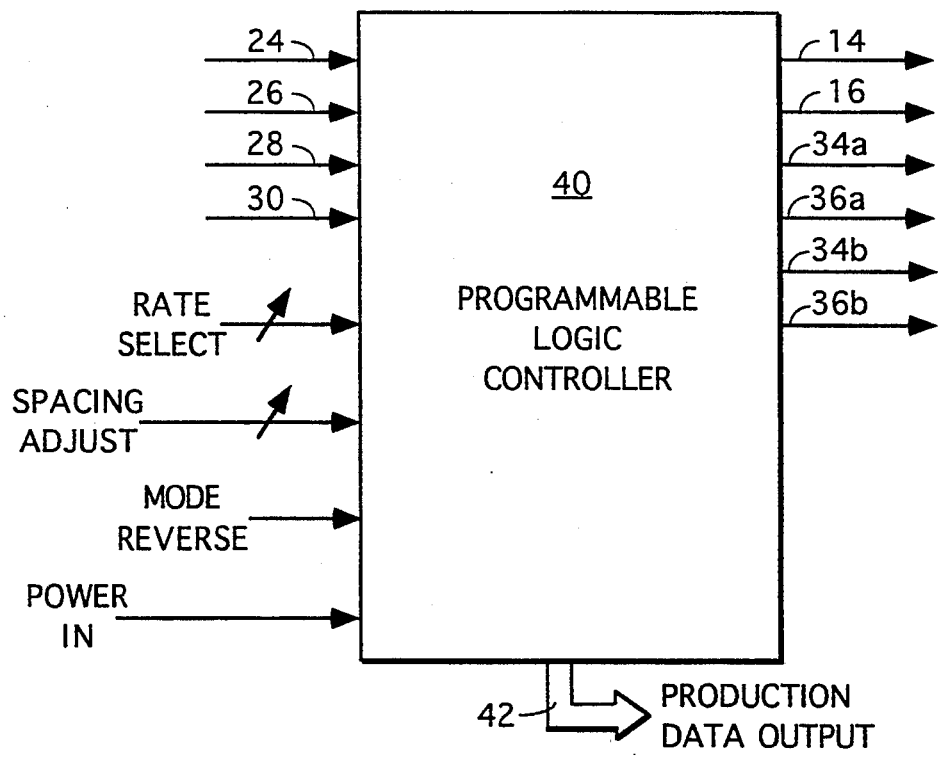
FIG. 2 is a schematic block diagram of a controller useful in the system shown in FIG. 1.

Turning to FIG. 2 the basic functions of the conveyor system controller are shown in schematic form. A particular controller that has been found by the Applicant to be useful in the practice of the present invention is the Omron Series C-200H Programmable Logic Controller which is available from Omron Corporation of St. Charles, Ill. Since such controllers are well known in the art and readily available in the market, the controller of the present invention will be described in functional terms with reference to the conveyor system of FIG. 1.

For purposes of this description assume conveyor 10 to be in the accumulate mode and conveyor 12 to be in the deliver mode. The output of detector 24 is zero when an article 18 is placed on conveyor 10 causing the controller 40 to activate drive motor 14 for a preselected time interval providing a spacing adjustment between related successive articles 18. When the detector 24 is producing an output conveyor 10 has the space available into which to deposit the next article 18. This operation can continue until detector 26 becomes blocked indicating that conveyor 10 is full. The controller 40 also activates indicator lamp 34b to designate conveyor 10 as being in the accumulate mode.

Conversely, conveyor 12 is in the deliver mode. Thus when detector 30 has a zero output an article 18 is in position to be removed. When the article 18 is removed the output of detector 30 causes the controller 40 to activate drive motor 16 until the next article 18 blocks detector 30, thus bringing the next article 18 into position. Indicator lamp 36a is activated to indicate the conveyor 12 as the one from which the next article 18 is to be removed.

When the supply of articles 18 has been exhausted from the conveyor 12 the operator at the delivery end of the system operates a mode-alternate switch 38 which causes the controller 40 to switch the conveyor operation such that conveyor 12 is operated in the accumulate mode and conveyor 10 is operated in the deliver mode. Indicator lamps 34a and 36b are activated to indicate the mode of operation. The detectors 26 and 30 may also be used to provide the information upon which to base mode-alternate switching.

The controller 40 may also be provided with a variable rate select input. This causes the controller to compare the rate at which the delivery conveyor drive motor is operated with a preselected rate. When the drive motor activation rate falls below the selected rate articles 18 are being removed at a sub-standard rate. The delivery end indicator 36a or b is caused to operate in an intermittent manner as an incentive to the delivery end operator to work faster and/or alert production supervisory personnel of a sub-standard operation.

Additional features that may easily be provided include a maximum accumulate mode. When the accumulate conveyor is completely full the controller may be programmed to automatically reverse the deliver conveyor to the first available space to accommodate another article. That conveyor is then temporarily operated in the accumulate mode until both conveyors 10 and 12 are full. This feature may be used to accommodate the temporary absence of an operator at the delivery end while allowing the operator at the accumulating end to keep working. A further optional feature is the temporary reversal of the accumulate conveyor operation to return articles to the operator at the accumulate end to assist with the operation to be performed by the delivery end operator. The conveyor system may also be caused automatically to operate at a preselected rate unless restored to normal operation through intervention of the delivery end operator. In some types of operations, it may be desired to route an article from a conveyor to the operator by other means such as for example a gravity chute. Such cases may easily be accommodated by relocating the delivery end detectors 26 and 30 to the operator workstation. The alternate operation of the conveyors 10 and 12 would otherwise remain the same. Finally, it will be understood that two or more conveyor systems of the present invention could readily be ganged end-to-end to thereby accommodate articles of differing dimensions, differing requirements for operators, increased buffer storage requirements.

The controller 40 may also be provided with a production data output 42 which may be coupled to a data processing facility to allow maintenance of production records for a variety of purposes such as inventory control, operator piece-work compensation, or the like.

The present invention has been described with reference to a two-conveyor belt system. It is to be understood that the principles of the invention apply as well to any plurality of conveyors wherein at least one is operated in each of the deliver and accumulate modes at any given time. Further, while particularly adaptable for use in manual assembly operations the principles are equally adaptable to operate with partially or fully automated assembly systems where sequential operations may operate at varying rates. The system essentially combines a buffer type of storage with non-synchronous operation.

From the foregoing, it will be understood that the applicant has provided a new and improved non-synchronous conveyor system wherein the objectives set forth hereinabove are efficiently achieved. Since certain changes in the above-described construction will occur to those skilled in the art without departure from the scope of the invention, it is intended that all matter set forth in the above-description or shown in the appended drawings shall be interpreted as illustrative and not in a limiting sense.

Having described what is new and novel and desired to secure by Letters Patent, what is claimed is:

1. A non-synchronous conveyor system for transporting articles between first and second workstations said system comprising
    a plurality of conveyors adapted to receive, support and transport articles from a first workstation to a second workstation;
    means for driving each of said conveyors independently of the other said conveyors, at least one in a deliver mode and at least one in an accumulate mode at any time;
    said driving means for a conveyor in the deliver mode operating to incrementally operate said conveyor each time an article is removed therefrom, and said driving means for a conveyor in the accumulate mode operating to incrementally operate said conveyor each time an article is placed thereon; and
    means for alternating the operation of said conveyors between said deliver and accumulate mode.

2. A conveyor system as recited in claim 1 further including
    first means for detecting the presence of an article placed upon a conveyor operating in the accumulate mode; and
    second means for detecting the removal of an article from a conveyor operating in the deliver mode.

3. A conveyor system as recited in claim 2 further including
    control means having inputs coupled to said first and second detecting means and outputs coupled to each of said conveyor driving means to thereby control the incremental operation of said conveyors.

4. A conveyor system as recited in claim 3 further including
    indicator means associated with each end of each said conveyor proximate said first and second workstations and coupled to said control means for indicating which of said conveyors is operating in the accumulate mode and which is operating in the deliver mode.

5. A conveyor system as recited in claim 1 wherein
    said alternating means comprises a two position switch disposed at said second workstation, coupled to each of said driving means, and operating to alternate the operation of said driving means between said accumulate mode and said deliver mode.

6. A conveyor system as recited in claim 4 further including
    means coupled to said control means for establishing a selected rate at which said conveyor drive means are to operated for satisfactory performance; and
    means for indicating that said conveyor drive means of a conveyor is being operated at a rate less than said selected rate.

* * * * *